United States Patent
Oehler et al.

(10) Patent No.: US 8,916,075 B2
(45) Date of Patent: Dec. 23, 2014

(54) METHOD OF MAKING A REINFORCED RESIN STRUCTURE

(75) Inventors: William F. Oehler, Coventry, CT (US); Wayne J. Caillouette, Longmeadow, MA (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 230 days.

(21) Appl. No.: 12/914,289

(22) Filed: Oct. 28, 2010

(65) Prior Publication Data

US 2012/0104651 A1    May 3, 2012

(51) Int. Cl.
- *B29C 43/18* (2006.01)
- *B29C 70/46* (2006.01)
- *B29K 83/00* (2006.01)

(52) U.S. Cl.
CPC ......... *B29C 70/467* (2013.01); *B29K 2083/005* (2013.01)
USPC ........... 264/257; 264/259; 264/319; 264/330; 264/331.11

(58) Field of Classification Search
CPC ........ B20C 43/18; B20C 35/02; B20C 39/10; B20C 39/265
USPC .......... 264/257, 331.11, 259, 271.1, 310, 330
See application file for complete search history.

(56) References Cited

U.S. PATENT DOCUMENTS

| | | | |
|---|---|---|---|
| 4,114,248 A | 9/1978 | Smith et al. | |
| 4,486,495 A | 12/1984 | Matsushita | |
| 4,645,709 A | 2/1987 | Klare | |
| 4,769,197 A | 9/1988 | Kromrey | |
| 4,772,521 A | 9/1988 | Kromrey | |
| 5,149,483 A | 9/1992 | Okey et al. | |
| 5,298,085 A * | 3/1994 | Harvey et al. | 136/244 |
| 5,521,238 A | 5/1996 | Ona et al. | |
| 5,672,309 A * | 9/1997 | Masui et al. | 264/257 |
| 5,672,641 A | 9/1997 | Beer et al. | |
| 5,763,043 A * | 6/1998 | Porter et al. | 428/109 |
| 6,660,203 B1 | 12/2003 | Fujimoto et al. | |
| 6,902,694 B2 * | 6/2005 | Novak | 264/46.4 |
| 7,105,120 B2 * | 9/2006 | Skinner et al. | 264/257 |
| 7,309,666 B2 | 12/2007 | Ishii et al. | |
| 2003/0157343 A1 | 8/2003 | Yeung | |

(Continued)

FOREIGN PATENT DOCUMENTS

| | | |
|---|---|---|
| DE | 3525301 A1 | 1/1987 |
| EP | 0272635 A2 | 6/1988 |
| WO | WO02072676 A2 | 9/2002 |

OTHER PUBLICATIONS

CV-2568 product profile, NuSil Technology, 2011.*

(Continued)

*Primary Examiner* — Larry Thrower
*Assistant Examiner* — Xue Liu
(74) *Attorney, Agent, or Firm* — Kinney & Lange, P.A.

(57) ABSTRACT

A method of making a reinforced resin structure is disclosed. A volume of uncured resin compound is placed on a first outer surface of a carrier structure comprising a plurality of fibers. The uncured resin compound and the carrier structure are pressed between two cooperating plates to disperse the resin compound into and through a plurality of passages between the plurality of fibers. The dispersed resin compound is cured to fix the resin within the plurality of passages and around the plurality of fibers.

16 Claims, 2 Drawing Sheets

(56) References Cited

U.S. PATENT DOCUMENTS

2003/0175533 A1* 9/2003 McGarry et al. .............. 428/447
2005/0255772 A1* 11/2005 Fung .............................. 442/168
2008/0064790 A1* 3/2008 Canpont et al. ............... 523/212
2010/0243033 A1* 9/2010 Brouwer et al. .............. 136/246

OTHER PUBLICATIONS

European Search Report, mailed Mar. 14, 2012.

* cited by examiner

METHOD OF MAKING A REINFORCED RESIN STRUCTURE

STATEMENT OF GOVERNMENT INTEREST

This invention was made with government support under Contract No. NNH08CD04C awarded by the National Aeronautics and Space Administration. The government has certain rights in the invention.

BACKGROUND

This invention relates generally to methods for producing composite materials, and more specifically to methods for producing reinforced resin pads, sheets, and other related structures.

Many electronic components, such as motor controllers and other high power circuits, are susceptible to damage or performance degradation due to excessive heat, including a substantial amount of waste heat generated during operation. Therefore, the heat that these and other surrounding components generate must be quickly and efficiently drawn away to an outer shell, a heat sink, or other heat dissipating structure. At the same time, electrical components in close proximity typically need to be electrically isolated from one another, as well as from other electrical conductors in the vicinity to prevent interference, short circuits, and other issues.

Resins, such as silicone, epoxy, or urethane, are often chosen to encapsulate electronic components due to favorable properties as an electrical insulator and thermal conductor, as well as their flexibility and relatively low weight. In many cases, these resins begin as uncured liquid or moldable solids, which can be directed or injected into gaps around the electronic components before curing in place. However, some resin-based encapsulants need to be reinforced by using a carrier structure when compressed into tight spaces or to otherwise improve their mechanical properties.

SUMMARY

A method of making a reinforced resin structure is disclosed. A volume of uncured resin compound is placed on a first outer surface of a carrier structure comprising a plurality of fibers. The uncured resin compound and the carrier structure are pressed between two cooperating plates to disperse the resin compound into and through a plurality of passages between the plurality of fibers. The dispersed resin compound is cured to fix the resin within the plurality of passages and around the plurality of fibers.

A method of making a reinforced silicone pad is disclosed. A volume of uncured silicone-based compound is placed on a first outer surface of a cloth comprising a plurality of woven fibers. The uncured silicone-based compound and the cloth are pressed between two cooperating plates to disperse the silicone resin compound into and through a plurality of passages around the plurality of woven fibers, the cooperating plates having pressing surfaces occupying parallel planes. The dispersed silicone-based compound is cured to fix cross-linked silicone within the passages around the plurality of woven fibers.

DETAILED DESCRIPTION

Figure 1A:
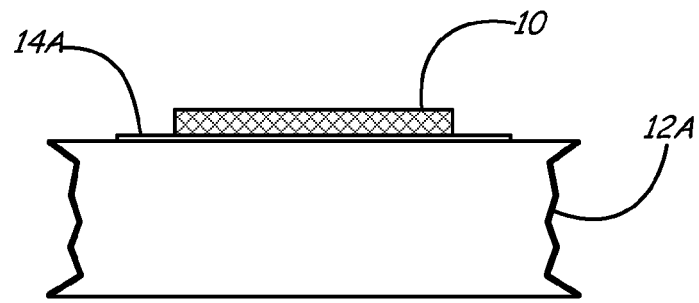
FIG. 1A schematically depicts a carrier structure, a release liner, and a pressure plate.

Many electronic devices include encapsulants, such as moldable cross-linked resin structures, which separate adjacent electronic components and fill gaps within an enclosure. Resins are often chosen to take advantage of the favorable thermal conductivity and dielectric properties of such materials. In attempt to maintain low thermal impedance between a heat-generating component and the encapsulant, air and fluid gaps are also minimized or eliminated. As such, some or all or the structure can be maintained under compression.

Over time, maintaining many unreinforced resins, such as silicone, urethane, or epoxies, under compression will lead over time to a phenomenon known as "compression set." For example, when unreinforced resin structures are subjected to continuous compression forces over a period of months, years, or decades, the structure will no longer "spring" back. Eventually, repeated thermal cycling, combined with compression set can lead to undesired gaps around the encapsulant. To maximize thermal transfer and dielectric separation, the encapsulating structure should remain in contact with the electrical component(s) and the enclosure throughout the device's useful life.

Even a relatively small degree of compression set can significantly affect the contact between the electronic components and the unreinforced resin, causing the thermal efficiency of the pad or sheet to decline markedly over time. This is problematic, for example, in applications such as aerospace systems where a component can be in service for missions lasting years or decades. Aerospace systems, including those used in long-term space travel and exploration missions, employ very sensitive and critical components and controllers. These are often designed to be very small and light to facilitate storage, repair and transport. And like many sophisticated electronics, they can generate a substantial amount of heat, leading to performance loss or thermal damage if thermal transfer is ever sufficiently compromised. Such gaps can also compromise the dielectric isolation between surrounding components.

Resin structures can be mechanically reinforced by a carrier structure such as various arrangements of natural or synthetic fibers, such as cloths or webbing. In the past, uncured resin has been introduced into a reinforcing carrier structure using a technique known as "doctor-blading." It is a slow methodical technique performed under low ambient pressure and requiring the use of organic solvents. Solvents soften or partially dissolve the uncured resin to allow it to be gently pushed into the carrier structure by a blade moving across each surface. However, doctor-blading is time consuming, complex, and organic solvents can introduce occupational and environmental complications.

FIGS. 1A-1F depicts the steps for one example embodiment of a method for producing a reinforced resin pad without the use of organic solvents. Generally, the method begins with placing a volume of uncured resin compound on a first outer surface of a carrier structure comprising a plurality of fibers. The next step includes pressing the uncured resin compound and the carrier structure between two cooperating plates to disperse the resin compound into and through a plurality of passages between the plurality of fibers. The following step describes curing the dispersed resin compound to fix the resin within the plurality of passages and around the plurality of fibers. This document describes these steps in detail, with optional and alternative steps, and concludes with an example implementation of the process.

FIG. 1A includes carrier structure 10 on bottom pressure plate 12A with release liner 14A between them. Carrier structure 10 can contain a plurality of woven or nonwoven fibers defining a plurality of voids, cells, or passages around the fibers. The overall structure can be of any size, but generally will approximate the desired shape of the cured product. In certain embodiments, the structure is a rectangular cloth or webbing with substantially uniform thickness. In these embodiments, there are two major outer surfaces, one of which is selected to receive a volume of uncured resin compound. Here, as will be seen in FIG. 1B, the compound is placed on the top outer surface. As will also be seen below, release liner 14A is disposed between carrier structure 10 and bottom plate 12A to facilitate later removal from plate 12A.

Figure 1B:
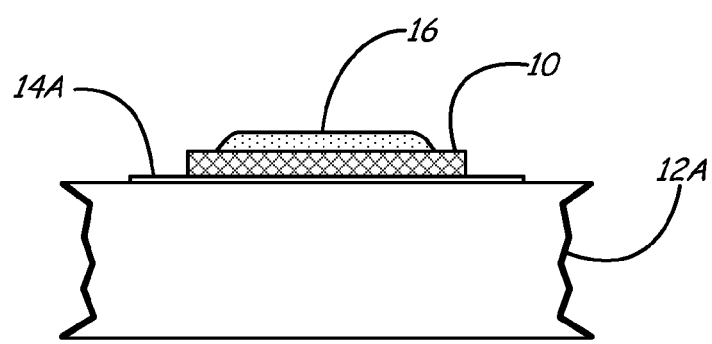
FIG. 1B shows a volume of uncured resin compound placed on the carrier structure.

FIG. 1B includes carrier structure 10, bottom plate 12A, release liner 14A, and uncured resin compound 16. A volume of uncured resin compound 16 is placed on a first outer surface of carrier structure 10. The volume of compound 16 placed on the selected outer surface will be sufficient to disperse under applied pressure (shown in FIG. 1D) throughout carrier structure 10 and fill any interior passages located therein. The volume generally approximates the total volume of the interior passages of the carrier structure, but will vary to account for a number of factors, many of which are detailed below. More material may be placed for reasons including heat shrinkage of compound 16, volume loss due to run-out during processing, and excess unreinforced material to ensure filling of the passages in carrier structure 10.

Uncured resin compound 16 can be a viscous fluid or moldable solid when placed on the outer surface of carrier structure 10. Pressure and heat applied in later steps discussed below, induces compound 16 to evenly penetrate and disperse throughout the carrier structure as described below. For example, compounds 16 with viscosities exceeding about 20,000 cP under ambient conditions will not immediately flow off of the surface of carrier structure 10, but may experience run-out during later processing. If desired to prevent run-out, resin compound 16 and carrier structure 10 can be retained within a mold or other suitable apparatus.

The base resin in compound 16 can be virtually any curable polymer where cross-linking is effectively reinforced by a carrier structure. Base resins are generally, but not exclusively thermally cured, and can include silicones, urethanes, and certain flexibilized epoxies. The base resin is chosen to balance cost, processing, and performance considerations.

The base resin can be self-curing and thus, in certain embodiments of the process, uncured resin compound 16 will comprise only the base resin. However, many resins, including many commercially available silicone compounds, are mixed with a hardening agent to initiate or catalyze the curing process. For example, some room temperature vulcanized (RTV) silicone rubber compounds, such as Circalok™ 6711, require addition of a catalyst compound, such as Circalok™ 6730. The hardener is typically added in a range of predetermined ratio relative to the resin. The ratio varies within a range specific to each combination of resin and hardener. For example, the quantity of hardener for these Circalok™ compounds ranges from about 0.5 parts by weight (pbw) to about 5.0 pbw per 100 pbw of base resin.

Generally, a higher concentration of hardening agent speeds the curing process, but increases overall viscosity of compound 16. This can slow dispersion of compound 16 (shown in FIG. 1D) as well as reduce the elasticity and compressibility of the final cured pad or sheet, limiting the ability of the final product to form and maintain a seal around components. Therefore, materials and ratios should be chosen carefully to balance processing time and mechanical properties. An illustrative example is provided below.

Additionally, in certain embodiments, thermal conductivity of the final product can be augmented by adding various powders or other fillers. Examples include aluminum nitride (AlN) and aluminum oxide ($Al_2O_3$). Fillers, including but not limited to AlN and $Al_2O_3$, generally have favorable dielectric and/or thermal properties. They can be readily ground or pulverized into a powder for mixing and suspension in the uncured resin compound. These powders then become fixed within the cross-linked polymer structure after curing and define numerous pathways through the final product to efficiently conduct and radiate thermal energy.

To ensure even distribution of powder and/or hardening agent, mixing should occur prior to placing compound 16 on carrier structure 10. The particle size of the filler powder varies based on the selected components and carrier structure 10, but is chosen to ensure adequate distribution throughout the product. In certain embodiments, the average particle diameter can range from 0.01 mm to about 0.1 mm. The concentration of the powder relative to the uncured resin can also affect the thermal and the mechanical properties of the final product. If the concentration of the filler is too high, such as when the AlN concentration exceeds about 40 pbw to 100 pbw of silicone resin, more pressure is required to disperse the uncured mixture into the carrier structure. Similar to the hardening agent, high concentrations of AlN or similar fillers can also limit elasticity of the cured product. With low concentrations, such as when there is no more than about 10 pbw of AlN filler to 100 pbw of uncured silicone resin, thermal conductivity may be insufficiently enhanced.

As noted above, carrier structure 10 includes a plurality of fibers with interconnected passages linking first and second outer surfaces. The passages define paths for the uncured compound to quickly disperse through the structure during application of pressure (shown in FIG. 1D). Carrier structure 10 can be an open weave type, which facilitates uniform dispersal of resin compound 16 during the application of pressure by providing includes wider and more numerous passages than materials with denser weaves.

An open weave, such as a leno weave, has a lower fiber density and is very flexible, contributing to improved elasticity in the finished product. In a leno weave fabric, fibers are wrapped and intertwined into an array of figure-eights with other fibers crossing through them, which balances light weight with structural stability. Suitable fiber materials are readily woven or configured into a cloth or other structure, and are chemically inert relative to the materials selected for the resin compound. Example fibers include coated or uncoated glass, fiberglass, or polymers such as polyacrylates.

Figure 1C:
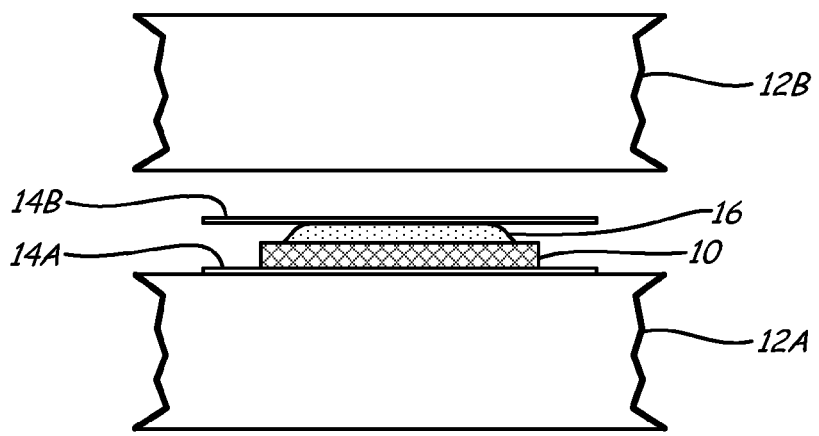
FIG. 1C depicts a second release liner placed over the compound as well as a second cooperating pressure plate.

FIG. 1C includes carrier structure 10, pressure plates 12A, 12B, release liners 14A, 14B, and uncured resin compound 16. Certain resins can exhibit more surface tackiness than others. Therefore, in certain embodiments of the process, release liners 14A, 14B can be placed on opposing surfaces of the pad adjacent respective plates 12A, 12B. For example, liner 14B is placed over resin compound 16 before pressure is applied by plates 12A, 12B. Release paper or liners may be well-known commercially available coated sheets of paper or plastic, and can be used to facilitate removal of the cured or uncured article such that the article never directly contacts plates 12A, 12B. This reduces transition time in certain embodiments of the process, as well as provides a smoother product surface by reducing the chances of the resin compound sticking to the pressure surface. A smooth surface reduces thermal interface resistance, improving overall heat transfer by maximizing contact with surrounding surfaces.

Figure 1D:
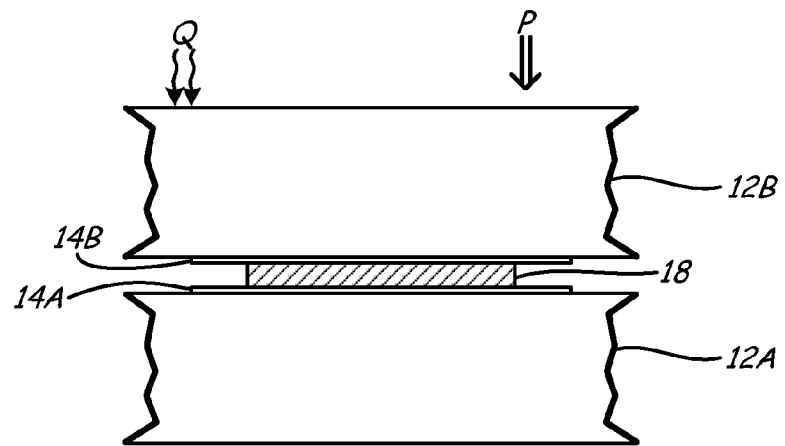
FIG. 1D illustrates pressure and heat being applied to the compound and the carrier structure by the cooperating pressure plates.

FIG. 1D shows application of heat Q and pressure P through cooperating plates 12A, 12B to form impregnated structure 18. Heat Q and pressure P is applied to disperse resin compound 16 into and through a plurality of passages between the plurality of fibers in carrier structure 10 (shown in FIG. 1C). The passages provide a plurality of fluid paths for the compound 16 to travel between the first outer surface and a second opposing outer surface. If a sufficient volume of resin compound 16 is placed on structure 10 (as shown in FIGS. 1B-1C), applied pressure P will cause resin compound 16 to saturate substantially all of the passages and reach the second outer surface.

Pressure P can be applied by any suitable machine, including a hydraulic press (not shown) with two cooperating plates 12A, 12B. Pressure can alternatively be applied using any other suitable apparatus. The pressure plates 12 are positioned on the press so as to evenly distribute the forces from the press over the entire surface area of the plates. For example, when producing a pad or sheet having a substantially uniform thickness, two plates 12A, 12B are configured each with a flat surface occupying parallel planes, such as is shown in FIG. 1D. In this way, force is applied substantially evenly over the entire first outer surface area where uncured compound 16 was placed.

The pressure and time required to implement the pressing step will depend on the materials selected. As noted above, virtually any solid or semi-solid resin can be reinforced with this method. In certain grades of silicone rubber, for example, the applied pressure can fall in the range of about 135 kPa (20 psig) to about 350 kPa (50 psig) over a time ranging from about 1 minute to about 10 minutes. In certain embodiments, the pressure is not held constant over the entire time period. The applied pressure can be temporarily reduced one or more times in a technique known colloquially as "bumping." Compound 16 can be bumped to release entrapped air, reducing the size and occurrence of voids and air bubbles in impregnated structure 18. Such imperfections, if still present after curing, diminish dielectric and thermal properties of the finished product. For example, with compounds 16 having a relatively short processing time before curing begins (known also as "pot life"), the materials are bumped within about a minute of pressure being applied to plates 12A, 12B.

It will be understood that time and/or pressure will be affected by viscosity of the resin compound as well the weave of the selected cloth. Viscosity of the compound can depend on the selected base resin as well as on the addition of other compounds as described above. Higher viscosities will generally raise the time and/or pressure required. Larger diameter fibers as well as tighter weaves can also have a similar effect due to fewer and smaller passages between fibers. However, applying heat Q at this stage can overcome these restrictions.

Heat Q can be applied before and/or during the application of mechanical pressure to assist with forming impregnated structure 18. Plates 12A, 12B include means for heating the press plate, or can be preheated before the pressing step. It will be recognized that uncured resins having high viscosities at ambient conditions will benefit the most from heat Q by decreasing its viscosity, which can speed the dispersal of compound 16 (shown in FIG. 1C). For example, heat Q can improve dispersal of high-viscosity resins, such as epoxies or high-density urethanes.

Heat Q can additionally or alternatively be applied before application of compound 16 to carrier structure 10 (shown in FIG. 1B). The constituents of compound 16 can be heated to facilitate mixing, and residual heat may be retained in the resin mixture. Heat Q can also facilitate more efficient application to an outer surface of the carrier structure, such as when carrier structure 10 (in FIG. 1B) has a relatively large surface area or higher fiber density. However, heating to decrease viscosity can also increase the potential for material run-out from between plates 12, mold sections, or other means for retaining the material and imparting substantially uniform pressure. It should also be noted that, for certain resins, excess heating at this stage may also induce curing before the compound has time to sufficiently disperse.

Dispersing the uncured resin via pressure is simple, produces a consistent product, increases the choice of available resins, and reduces issues of hazardous chemical handling and disposal. In contrast, doctor-blading is a slow methodical technique, in which very thin layers of uncured liquefied resin are applied one-by-one to each outer surface of a carrier structure until the resin fully seeps into both sides of the weave. It is believed that doctor-blading in this instance works by using the organic solvent to partially separate the long unlinked polymer chains, so that shear forces on the chains caused by localized blade pressure pushes them into one side of the carrier structure. In contrast, it is believed that applied pressure generates heat from the frictional resistance between adjacent uncured polymer chains. As heat builds up, the chains begin to untangle and separate and can more readily slide past one another and into the passages throughout the carrier structure. By using pressure in lieu of organic solvents, inherent handling and disposal problems are avoided, and occupational hazards are reduced.

This process further simplifies reinforcing of resin structures by ensuring substantially uniform dispersal of the uncured material in a single step. Doctor-blading involves applying uncured resin as individual layers to each major outer surface of a carrier structure. In contrast, a sufficient quantity of compound can be pressed in a single step into a single outer surface and will disperse throughout the passages to an opposing outer surface. For example, for a sheet or pad, a resin/solvent mixture is applied by a doctor-blade in individual layers across both sides of the carrier structure until additional layers of the mixture no longer penetrate. However, the interior volume and passages are not readily observable. Thus, it can be difficult to ensure the resin has sufficiently dispersed and saturated the structure. In contrast, applying pressure, such as in the manner disclosed, causes the resin to completely disperse through the interconnected passages, and it is easy to troubleshoot problems with application and dispersal.

Insufficient dispersal can be recognized after pressing by examining the outer surfaces of the carrier structure for presence of the uncured compound. For example, a sufficient volume of the compound will eventually reach the opposing outer surface after application of pressure. If the volume is sufficient, the uncured compound will be present over the entire opposing surface after pressing. If volume is insufficient, there will be no compound left on the first surface, nor will the opposing surface be saturated with the resin. When sufficient volume is present, compound remaining on the first surface but not the opposing surface most likely indicates insufficient heat, pressure and/or pressing time.

The disclosed process increases flexibility in material selection due to its applicability for both RTV and high-temperature resins. In contrast, doctor-blading is difficult to employ with commercially available RTV resins. Since RTV resins cure at or near room temperature, the curing process often begins before the resin can be fully applied using a doctor-blade. Many compounds have a limited "pot life" of an hour or less before curing progresses to a point affecting resin application. Thus to prevent premature curing of RTV resins, doctor-blade application is best done in a low-temperature, low-pressure environment. Without specialized equipment, RTV resins have limited advantages using the prior process.

Figure 1E:
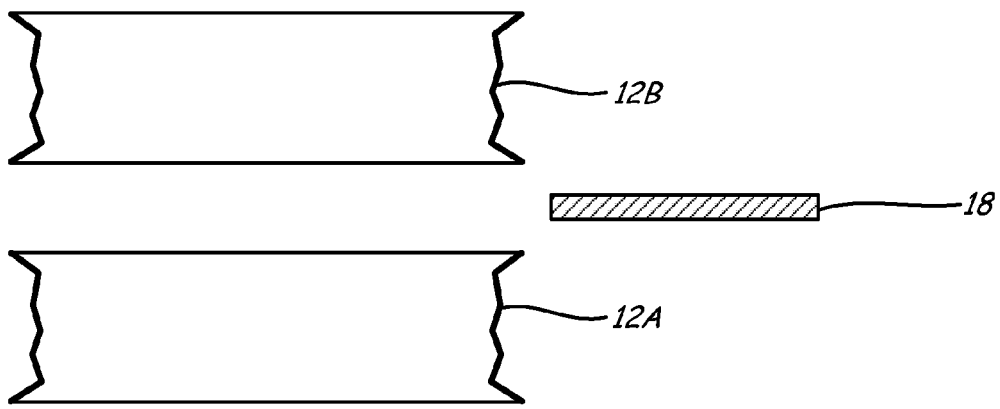
FIG. 1E shows an impregnated carrier structure removed from between the pressure plates.

FIG. 1E depicts impregnated structure 18 after being removed from between cooperating press plates 12A, 12B. As can be seen in the figure, release liners 14A, 14B (shown in FIG. 1D) have been removed and structure 18 is ready for further processing, including curing.

Figure 1F:
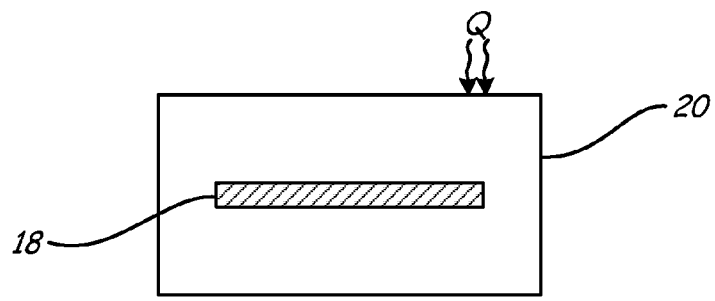
FIG. 1F depicts the impregnated structure being heated.

FIG. 1F shows impregnated structure 18 in oven 20 for curing by application of heat Q. Curing fixes the dispersed resin compound within the plurality of passages and around the plurality of fibers. Depending on the resin material chosen, curing includes any process whereby the precursor compound undergoes an irreversible chemical reaction, such as polymerization and/or cross-linking.

The curing parameters are dependent on the properties of the selected resin compound and any additives. This is illustrated in the following description and in the example below. In certain embodiments, this process can be used with both RTV and elevated temperature cured resins. As noted above, there are many commercially available RTV resins with wide-ranging thermal, electrical, and mechanical properties, including silicone-based, urethane-based, and epoxy-based materials. And as described above, RTV resins can be used in this process without providing a low-temperature, low-pressure environment, which is often necessary in the prior process to inhibit premature curing of the compound during application.

Curing time required also depends on the selected resin compound and the relative concentrations of its constituents. Higher concentrations of a hardening agent, if applicable for a particular compound, will promote efficient and robust cross-linking of adjacent polymer chains in and around the passages. This will typically reduce curing time but can also reduce elasticity of the final product as described above.

Heat Q is added via oven 20 to facilitate the curing process. As explained above, certain materials cure at elevated temperatures, and thus heating will be required in such scenarios. In certain other embodiments, selecting a resin that can be cured at or near room temperature simplifies the production of the protective pads or sheets because they do not require additional equipment, such as oven 20 to cure the resin. However, though it is not necessary to heat RTV materials to initiate or sustain the curing process, higher temperatures often expedite curing and hardening. Curing RTV compounds, such as in oven 20, can reduce overall processing time by speeding the chemical reaction(s) behind curing. This can help increase throughput of a manufacturing operation.

Recall that FIG. 1E shows uncured impregnated structure 18 being removed from between plates 12 before being placed into oven 20 (in FIG. 1F) for curing. It will be recognized that heat Q applied in FIG. 1F by oven 20 for curing can alternatively be applied by plates 12 in FIG. 1D. In these alternative embodiments, curing heat Q can be applied by plates 12 with or without pressure P. As such, FIGS. 1E and 1F would not be applicable to these embodiments.

It should also be noted that the method has been described relative to thermally cured resins, but the curing step can be readily adapted for resins cured using other forms of energy. The appropriate form of energy, such as ultraviolet or microwave radiation, is substituted for heat Q to facilitate curing of such resins.

Various embodiments of the disclosed process, including several alternatives have been detailed above. Following is an example illustration of the above described process adapted to produce a silicone pad reinforced by a glass fiber carrier structure.

EXAMPLE

A leno weave fiberglass cloth is used, having a fiber density of about 1.8 oz/yd$^2$ at a thickness of about 0.11 mm (0.0045 in). The cloth is available from commercial suppliers. A segment of the cloth is cut to dimensions of about 152 mm (6.0 in) square for use as a carrier structure. The cloth segment is placed on a release liner coated with polytetrafluoroethylene (PTFE), which in turn is placed on one of two steel pressure plates.

Approximately 50 grams of uncatalyzed RTV silicone resin, sold commercially as Circalok™ 6711, having a density of about 2.2 g/cm$^3$ and viscosity of about 30,000 cP at 25° C., are mixed with about 2.5 grams of compatible hardening agent, sold commercially as Circalok™ 6730, giving a ratio of about 5.0 pbw of hardener to about 100 pbw of base resin. This example hardening agent is a catalyst that promotes a cross-linking reaction between adjacent silicone polymer chains. The uncured silicone resin compound is then placed atop the cloth.

A second release liner is disposed between the uncured compound layer and a second pressure plate. The plates are attached to a hydraulic press with a piston capable of maintaining a pressure of at least about 13.8 MPa (2000 psig). The plates are arranged in parallel planes to evenly distribute mechanical forces over the area of the cloth. The plates are also heated to a temperature of about 82° C. (180° F.).

In this example, a maximum of about 13.8 MPa (2000 psig) is applied to the pressure plates by a hydraulically actuated piston having a diameter of about 25 mm (1.0 in). Each plate measures about 150 mm (6.0 in) per side, resulting in a maximum effective pressure of about 44 psig oriented substantially normal to the major outer surfaces of the cloth. Within about a minute, the applied pressure is reduced by about 80% to release entrapped air and prevent voids and bubbles in the pad. Pressure is then reapplied to its original magnitude for another five minutes. The plates are maintained at constant temperature for a total of about two hours to cure the silicone, fixing the compound within the passages of the cloth.

Once the curing time is elapsed, the pad is removed, the release liners are detached, and the pad is allowed to cool. If necessary, excess unreinforced material can be trimmed from edges of the pad. The cured pad has a dielectric strength of at least about 12 kV/mm (300 kV/in), thermal conductivity of about 0.72 W/(m*K), and a Shore A hardness value of at least about 55. In this example, the pad is then cut into smaller segments suitable for installation into an enclosure for housing at least one electronic component. The pad segments are placed into the enclosure under compression such that each component is electrically isolated from any other component and from the enclosure. Each component is also in physical contact with one or more pad segments to minimize thermal impedance caused by the material interface. An example component can be an electronic device having a plurality of high-energy capacitors, such as a solid state motor controller that generate significant quantities of waste heat.

It should be noted that since the resin used in this example is an RTV silicone rubber compound, additional heat need not be provided to the pad in order to facilitate the curing process. However, as noted above, pads produced with many RTV materials can be heated to speed the cross-linking reactions. In this particular example, decreasing the curing temperature to room temperature conditions (about 25° C./77° F.) from the above-described 82° C./180° F. increases the curing time to about 24 hours from about 2 hours. Similarly, decreasing the concentration of hardening agent also slows the curing reaction. At room temperature curing conditions, reducing the concentration of Circalok™ 6730 catalyst in the compound by a factor of ten (to about 0.5 pbw hardener to about 100 pbw resin) further increases the curing time to 72 hours. At the elevated temperature of about 82° C. (180° F.), curing time increases from about 2 hours to about 6 hours. In this example, the glass cloth does not noticeably affect curing time compared to unreinforced resins. However, an effect may be seen in certain other embodiments.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a reinforced resin structure, the method comprising:
    placing a volume of uncured RTV silicone resin compound on a first outer surface of a carrier structure comprising a plurality of uncoated fibers woven into an open leno weave, the uncured RTV silicone resin compound being free of organic solvents;
    pressing the uncured RTV silicone resin compound and the carrier structure between two cooperating plates to disperse the resin compound into and through substantially all of a plurality of passages between the plurality of uncoated fibers; and
    curing the dispersed resin compound to fix the resin within substantially all of the plurality of passages and around the plurality of fibers to form the reinforced resin structure with a carrier structure that is entirely encapsulated in the silicone resin without unfilled passages between the plurality of fibers.

2. The method of claim 1, wherein the uncured RTV silicone resin compound comprises a base liquid silicone resin.

3. The method of claim 1, wherein the plurality of fibers are one of: glass, polymer, and fiberglass.

4. The method of claim 1, wherein the pressing step is performed by a hydraulic press having at least one piston.

5. The method of claim 4, wherein a first cooperating plate includes a first pressing surface and a second cooperating plate includes a second pressing surface, the first and second pressing surfaces occupying substantially parallel planes.

6. The method of claim 1, further comprising the step:
    heating the uncured RTV silicone resin compound to expedite dispersing of the compound through the plurality of passages.

7. The method of claim 6, wherein the heating step is done during the pressing step by heating at least one of the cooperating plates.

8. The method of claim 1, wherein the base resin is chosen such that the compound will cure at a temperature of about 77° F. (25° C.).

9. The method of claim 8, wherein the curing step is performed at a temperature substantially above about 77° F. (25° C.).

10. The method of claim 2, wherein the uncured RTV silicone resin compound further comprises a compatible catalytic hardening agent.

11. The method of claim 2, wherein the uncured RTV silicone resin compound further comprises an additive to increase thermal conductivity of the reinforced resin structure.

12. The method of claim 11, wherein the additive comprises aluminum nitride (AlN).

13. The method of claim 2, wherein the base resin has a viscosity of at least about 30,000 cP at a temperature of about 77° F. (25° C.).

14. The method of claim 13, wherein the pressing step includes applying a maximum pressure of about 44 psig to the uncured resin compound and the carrier structure.

15. The method of claim 14, wherein the pressing step includes temporarily reducing the applied pressure for releasing entrapped air.

16. The method of claim 3, wherein the plurality of fibers include fiberglass having a fiber density of about 1.8 oz/yd$^3$.

* * * * *